United States Patent [19]

Harris et al.

[11] Patent Number: 4,654,742
[45] Date of Patent: Mar. 31, 1987

[54] DISK CASSETTE PRESSURE SPRING MECHANISM

[75] Inventors: Clark E. Harris, Fairport; Roger G. Covington, Rochester, both of N.Y.

[73] Assignee: Eastman Kodak Company, Rochester, N.Y.

[21] Appl. No.: 799,514

[22] Filed: Nov. 19, 1985

[51] Int. Cl.$^4$ ............................................. G11B 23/02
[52] U.S. Cl. ................................................... 360/133
[58] Field of Search .................. 360/133, 97, 135, 137

[56] References Cited

U.S. PATENT DOCUMENTS 3,668,658 6/1972 Flores et al. ................. 340/174.1 C
4,038,693 7/1977 Huffine et al. ........................ 360/99
4,149,207 4/1979 Porter, Jr. et al. ................. 360/133
4,263,634 4/1981 Chenoweth et al. ............... 360/133
4,510,546 4/1985 Asami et al. ......................... 360/133

Primary Examiner—John H. Wolff
Attorney, Agent, or Firm—Steve W. Gremban

[57] ABSTRACT

A disk cassette is disclosed comprising an information storage disk enclosed within a lined jacket which is housed in a cassette formed of top and bottom halves of rigid material. A pressure spring mechanism is provided on the top and bottom halves for sandwiching the jacket therebetween, and is located adjacent to and upstream of registering radial slots in the cassette and jacket through which transducers may extend into information transferring contact with the disk.

7 Claims, 3 Drawing Figures

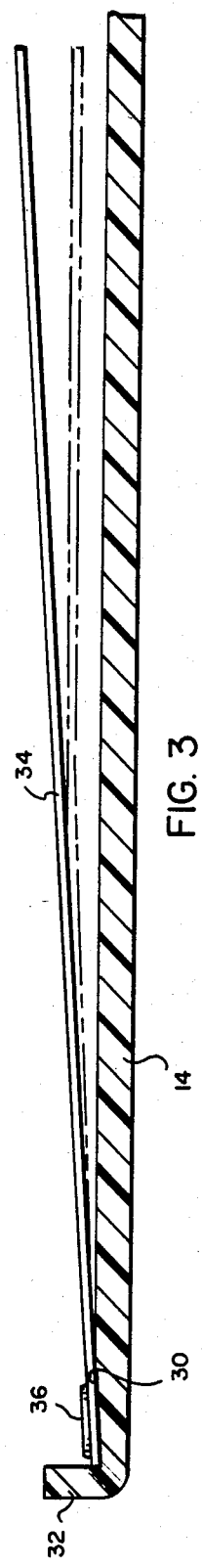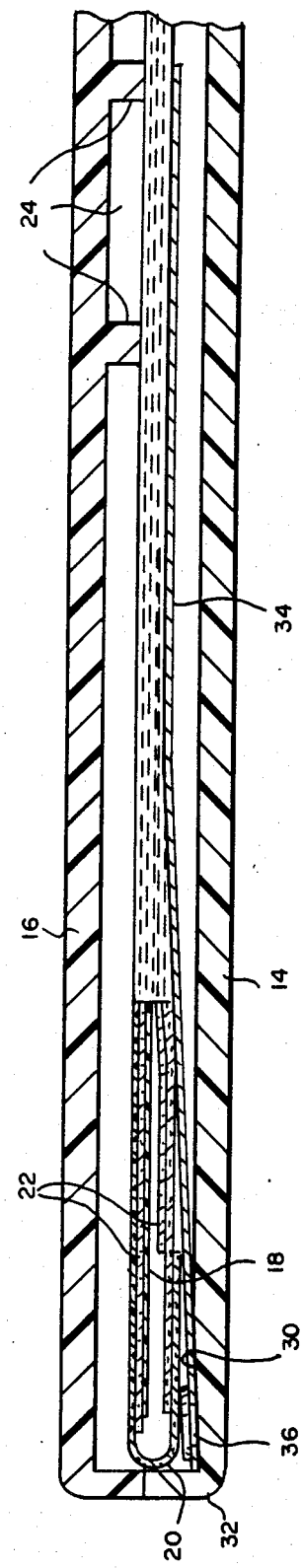

DISK CASSETTE PRESSURE SPRING MECHANISM

BACKGROUND OF THE INVENTION

1. Field of the Invention

This invention relates generally to disk cassettes, and more specifically to a disk cassette within which a pressure spring mechanism is incorporated.

2. Description of the Prior Art

U.S. Pat. No. 4,510,546 which issued to Asami et al. discloses a magnetic disk apparatus wherein a flexible magnetic disk is contained in a flat case. Liner sheets for removing dust from the disk are inserted between the upper surface of the magnetic disk and the case and also between the lower surface of the disk and case. A flexible pressure member is provided within the case for pressing the liners against the disk for cleaning the disk. In FIG. 6A, the pressure member is mounted on one shell of the case and presses the sandwich of liners and disk against a plurality of projections integrally formed on the opposite shell.

A sponge clamp on a mechanical drive for squeezing a flexible cassette in which a floppy disk is housed is disclosed in U.S. Pat. No. 3,668,658 which issued June 6, 1972 to Flores et al. The sponge clamp squeezes the cassette in the vicinity of a transducer access aperture. This presses a liner within the casing into wiping engagement against a record surface of the disk for cleaning same.

U.S. Pat. Nos. 4,038,693 and 4,263,634 disclose disk-jacket assemblies having a pressure pad position located upstream with respect to a transducer access slot. The pressure pad in conjunction with the associated platen holds the disk in a fixed predetermined plane suitable for reliable data transfer by the transducer, and holds liner panels in firm contact with the disk for cleaning the disk.

A magnetic disk cartridge having a disk cleaning mechanism is disclosed in U.S. Pat. No. 4,149,207 which issued to Porter, Jr. et al. on Apr. 10, 1979. The disk cleaning mechanism comprises internal ribs having V-shaped slots on the top and bottom halves of the cartridge. A disk is rotatably transported between the ribs, and flexible V-shaped films to which cleaning liners are attached are secured to the ribs for engaging opposite sides of the disk for cleaning same.

SUMMARY OF THE INVENTION

In accordance with a preferred embodiment of the invention, a disk cassette pressure spring mechanism is disclosed comprising a flexible information storage disk enclosed within a jacket housed within an enclosure formed by top and bottom cassette halves. The jacket and cassette halves have registering radially extending longitudinal transducer access slots. One of the top and bottom halves has a plurality of spaced apart ribs on its inner surface adjacent the slots. A leaf spring has one end secured to the other of the top and bottom halves, and its opposite free end in register with the ribs for pressing the jacket and storage disk against the ribs for stabilizing and vertically registering a portion of the disk in a uniform plane immediately prior to its transport through the slots.

In a more specific aspect of the invention, the ribs extend transverse to the longitudinal axis of the slots. Also, the other of the top and bottom halves has a slanted recess on the inner surface thereof along a side edge that is parallel to the slots, and a lug on the inner surface in the recess. The one end of the leaf spring has an opening for receiving the lug which is staked to the leaf spring. The spring is made of stainless steel, and exerts a constant force on the jacket of about 25 to 40 grams for an extended period of time.

A primary advantage of this invention is to provide an improved disk cassette pressure spring mechanism that is of simple design and construction, is thoroughly reliable and efficient in operation, and economical to manufacture. The spring mechanism advantageously applies a relatively constant force to the jacket and disk sandwich to clean the disk, properly register it vertically and to stabilize it by eliminating any oscillations in the disk immediately before the disk is transported through the transducer access slots and engaged by the transducers.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 2 is an enlarged section view taken substantially along line 2—2 of FIG. 1; and FIG. 3 is a segmental view partly in section showing the spring in load and no-load positions.

DETAILED DESCRIPTION OF THE INVENTION

Figure 1:
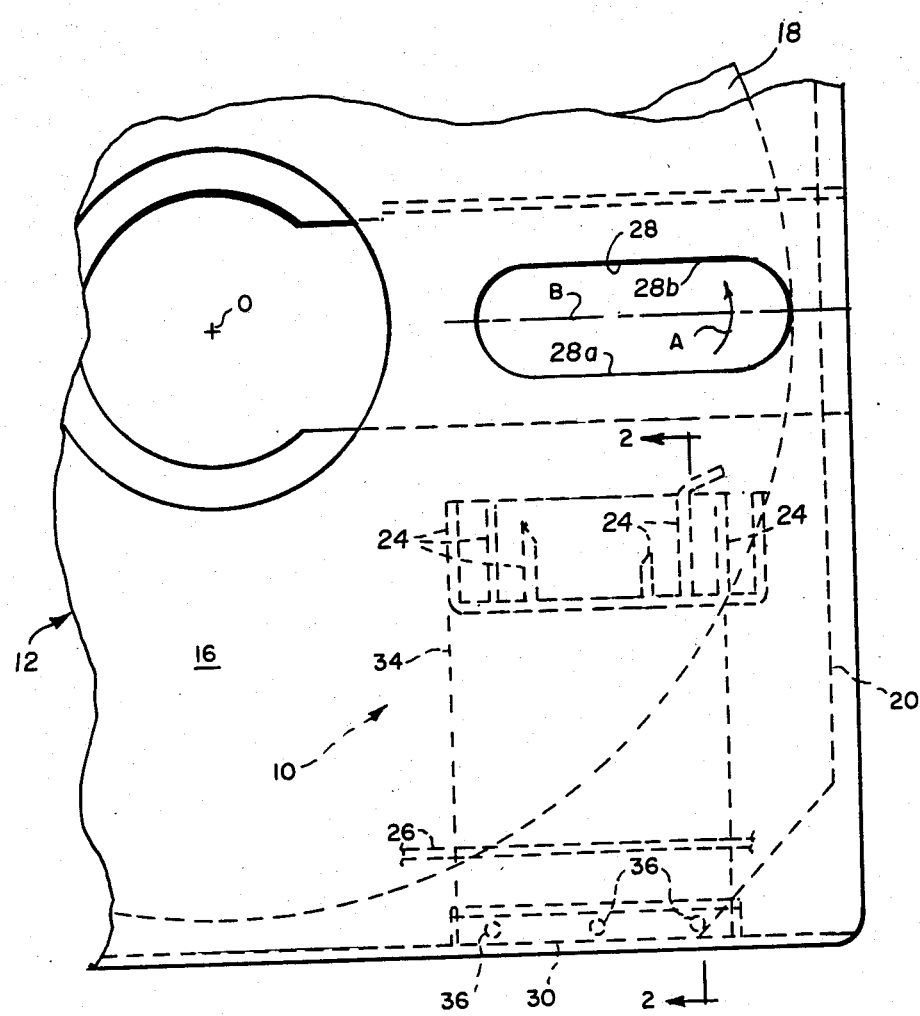
FIG. 1 is a segmental bottom view of a corner of a disk cassette in which a preferred embodiment of a pressure spring mechanism of the invention is embodied.

Referring now to FIGS. 1 and 2 of the drawings, a preferred embodiment of a pressure spring mechanism 10 is shown incorporated in a disk cassette 12. The disk cassette comprises top and bottom halves 14, 16 respectively preferably formed of a relatively rigid molded material to enclose and protect a flexible circular information storage medium or disk 18. The disk is housed in a jacket 20 for rotation about an axis O in the direction of arrow A. The jacket may constitute a single piece of polyvinyl chloride acetate, for example, having two halves folded over to form a closed structure that nests within the cassette. The jacket 20 is also preferably provided with inner circular cleaning liners 22 of substantially the same size as disk 18 and made of any suitable non-woven fabric such as rayon, for example. The top and bottom halves 14, 16, jacket 20 and liners 22 are all provided with vertically aligned or registering longitudinal transducer access slots 28, of which only the slots in bottom half 16, lower half of jacket 20 and liner 22 adjacent thereto are seen in FIG. 1.

The pressure spring mechanism 10 comprises vertical registration support ribs 24, 26 for supporting the outer surface of one of the halves of jacket 22 with disk 18 enclosed therein in proper vertical registration at the transducer access slots 28. The ribs 24 are preferably integral with and extend from the inner surface of bottom half 16, as best seen in FIG. 2. Ribs 24 are preferably thin elongate parallel members arranged transverse to the major axis B of transducer access slots 28, and are located as close to the upstream side 28a of the slots as possible relative to the downstream direction of rotation of disk 18, illustrated by arrow A. Elongate thin rib 26 is arranged parallel to the major axis. Accordingly, upon rotation of disk 18, portions thereof continuously pass through the slots 28 from the upstream side 28a thereof to the downstream side 28b.

Top half 14 of cassette 12 has a narrow flat slanted recess 30 on its inner surface adjacent a side edge 32 thereof for supporting one end of a rectangular leaf spring 34. The spring is made from a non-magnetic material, such as stainless steel, for providing a constant load force in the range of 25 to 40 grams for an extended perior of time. Recess 30 slants downwardly at a small angle toward side edges 32 thereof and has three laterally extending lugs 36 integral with the recess surface. Leaf spring 34 has three complementary openings for receiving lugs 36, and a leaf spring end is secured to top half 14 by staking the lugs. In this staked position, spring 34 extends outwardly in its free unloaded position, as seen in full lines in FIG. 3, along a line that is an extension of slanted recess 30. The spring 34 assumes the loaded position seen in full lines in FIG. 2 and by dotted lines in FIG. 3 when the top and bottom halves 14, 16, with jacket 20 and disk 18 interposed therebetween, are secured together by any suitable means to form a disk cassette. In this loaded position, the free end of spring 34 overlaps ribs 24 and exerts a force against jacket 20 interposed therebetween of about 25 to 40 grams for pressuring the cleaning liners 22 against both sides of disk 18, accurately vertically registering the disk and stabilizing the disk by removing fluctuations and oscillations therein. With this invention, the disk cleaning, registration and stabilization are done immediately before disk 18 is transported through transducer access slots 28 for better recording results than has been achieved heretofore.

The invention has been described in detail with particular reference to preferred embodiments thereof, but it will be understood that variations and modifications can be effected within the spirit and scope of the invention.

What is claimed is:

1. A disk cassette pressure spring mechanism for stabilizing and vertically registering the disk comprising:
   top and bottom cassette halves joined together to form an enclosure, said cassette halves having registering radially extending longitudinal slots through which transducers may extend, said slots having an upstream side and a downstream side;
   a flexible information storage disk rotatable in a downstream direction;
   a jacket mounted within said cassette enclosure and comprising two jacket halves for enclosing said storage disk for rotation, said jacket halves having registering radially extending longitudinal apertures in alignment with said slots;
   a plurality of parallel, spaced apart ribs integral with the inner surface of one of said top and bottom cassette halves and positioned adjacent said upstream side of said slot in said one cassette half; and
   a leaf spring having one end secured to the other of said top and bottom cassette halves and its opposite free end in register with said ribs for pressing said jacket and storage disk against said ribs for stabilizing and vertically registering a portion of said disk in a uniform plane immediately before it passes from said upstream side of said slots to said downstream side thereof.

2. A disk cassette pressure spring mechanism according to claim 1 wherein said ribs extend transverse to said slots.

3. A disk cassette pressure spring mechanism according to claim 1 wherein said other of said top and bottom cassette halves has a slanted recess on the inner surface thereof along a side edge that is parallel to said slots, and said one end of said leaf spring nests in said recess and is secured thereto.

4. A disk cassette pressure spring mechanism according to claim 3 wherein said other cassette half has a lug on said inner surface in said recess extending through an opening in said one end of said leaf spring to which it is staked.

5. A disk cassette according to claim 4 wherein said spring exerts a force on said jacket of about 25 to 40 grams.

6. A disk cassette according to claim 5 wherein said spring is a stainless steel spring.

7. A disk cassette according to claim 6 wherein a cleaning liner is interposed between at least one of said jacket halves and said disk.

* * * * *